July 6, 1943.  S. HUNT  2,323,603
FREQUENCY MODULATION DETECTOR
Filed Aug. 26, 1941
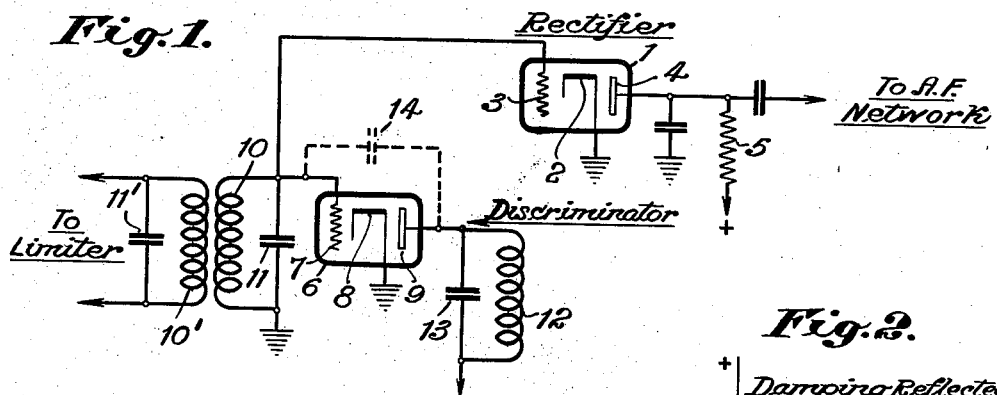
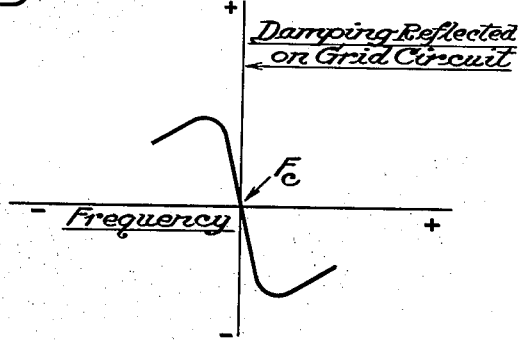
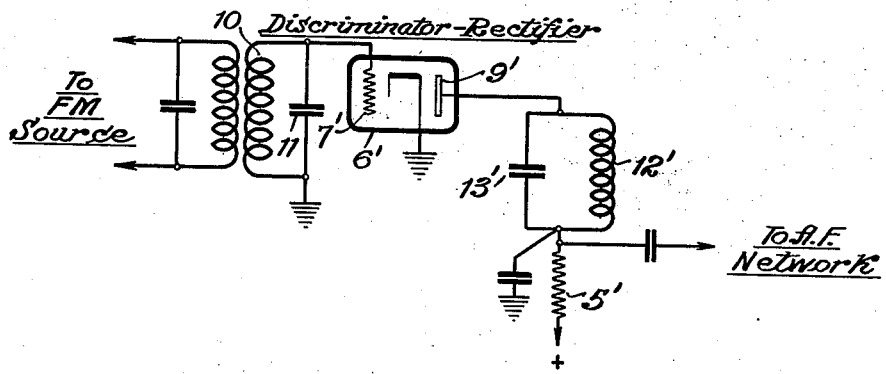
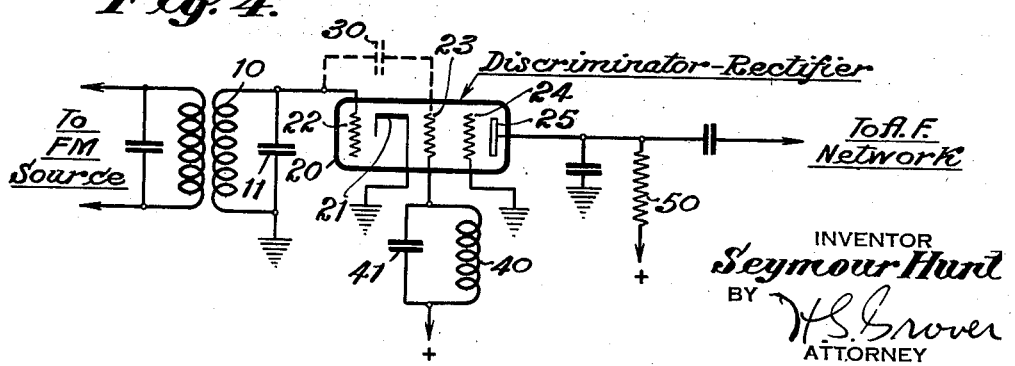
INVENTOR
Seymour Hunt
BY
H.S. Grover
ATTORNEY Patented July 6, 1943

2,323,603

UNITED STATES PATENT OFFICE 2,323,603

FREQUENCY MODULATION DETECTOR

Seymour Hunt, Flushing, N. Y., assignor to Radio Corporation of America, a corporation of Delaware Application August 26, 1941, Serial No. 408,319

11 Claims. (Cl. 250—27)

My present invention relates to frequency modulated carrier wave detectors, and more particularly to frequency, or phase, modulated carrier wave detectors utilizing inter-electrode capacity of a tube to provide a discrimination action.

As is well known to those skilled in the art of receiving frequency, or phase, modulated carrier waves, there must be employed for the demodulation step a rectifier which has a discriminator input network. The function of the discrimination input network is to convert the frequency-variable waves into amplitude modulated waves. Hence, the discrimination network commonly utilizes an S-shaped characteristic relating frequency variation to output current.

It is known, furthermore, that in an electron discharge tube having tuned grid and plate circuits resonated to a common operating frequency, the tuned plate load will vary in reactive sign as the frequency of the tuned grid circuit is varied relative to a reference frequency. The tuned grid circuit of the tube may be variably damped by applying thereto a frequency-variable current. Hence, the variation in resultant voltage across the tuned grid circuit may be rectified, and the rectified voltage will then correspond to the frequency deviations of the frequency-variable waves.

Accordingly, it may be stated that it is one of the main objects of my present invention to provide a discriminator circuit for angular velocity-modulated carrier waves; the discriminator comprising a tube having tuned input and output electrode circuits resonated to the center frequency of the applied waves, and the resultant variable voltage developed across the tuned input circuit being rectified to provide the modulation signal voltage.

Another important object of this invention is to provide an electron discharge tube provided with at least a cathode, control grid and plate, resonant input and output circuits being connected to the grid and plate respectively, the resonant circuits being each tuned to the center frequency of applied frequency, or phase, modulated carrier waves, and means being employed for rectifying the resulting amplitude modulation voltage which is developed across the tuned input circuit.

Another object of my invention is to provide a combined discriminator-rectifier network which employs a single electron discharge tube having tuned input and output circuits respectively associated with the control grid and plate of the tube, and the said circuits being each resonated to the mid-frequency of applied frequency modulated carrier waves, a load resistor being connected in circuit with the tuned output circuit for developing thereacross modulation voltage.

Yet another object of my invention is to provide an electron discharge tube which is provided with an input grid, a cathode, plate and an auxiliary cold electrode; separate tuned circuits being respectively connected to the input grid and auxiliary electrode, the separate circuits being tuned to the center frequency of applied frequency-variable waves, and a load impedance being in circuit with the plate for developing voltage corresponding to the frequency deviations of the applied waves.

Still other objects of my invention are to improve generally the construction and operation of frequency modulation detectors, and more especially to provide improved frequency modulation detectors which are not only reliable in operation, but are economically manufactured and assembled.

The novel features which I believe to be characteristic of my invention are set forth in particularity in the appended claims; the invention itself, however, as to both its organization and method of operation will best be understood by reference to the following description taken in connection with the drawing in which I have indicated diagrammatically several circuit organizations whereby my invention may be carried into effect.

In the drawing:

Fig. 1 shows an embodiment of the invention,

Fig. 2 shows the characteristic of the discriminator in Fig. 1,

Fig. 3 shows a modification of the invention,

Fig. 4 illustrates still another modification.

Referring now to the accompanying drawing, wherein like reference characters in the different figures designate similar circuit elements, in Fig. 1 there is shown the networks of a superheterodyne receiver of the frequency modulation type which are located between the intermediate frequency (I. F.) amplifier and the modulation voltage, or audio, amplifier. In general, such receivers comprise a signal collector, as a dipole, feeding one or more tunable ultra-short wave amplifiers. A local oscillator feeds local oscillations to a converter, the latter being supplied with amplified signals as well. The I. F. output of the converter is fed to one or more I. F. amplifiers. As is well known, the frequency modulation band covers an assigned range of 42-50 megacycles (mc.). Each station in the band has a permissible 200 kilocycle (kc.) deviation width; that is, the center frequency, or carrier, may be deviated up to 100 kc. on either side. Of course, the frequency deviation of the carrier commesponds to the audio modulation amplitude, while the rate of deviation corresponds to the audio, or modulation, frequencies themselves.

The I. F. amplifiers, as well as the pre-converter stages, will be designed to have pass bands of 200 kc. Since the demodulation process at the receiver must derive the modulation signal from the modulated carrier waves, there must be no amplitude modulation effects on the carrier at the detector input circuit. Fading, noise pulses, passage of the waves through the cascaded resonant circuits; these all tend to produce amplitude modulation in the frequency-variable waves. Hence, a limiter device is used subsequent to the I. F. amplifier, and prior to the discriminator, for removing the amplitude modulation effects on the carrier wave. These various networks are all too well known to require a detailed showing and description.

In Fig. 1, the numeral 1 designates a rectifier, or demodulator, device. It comprises a tube having a cathode 2, a control grid 3 and plate 4. The cathode may include a properly bypassed self-biasing resistor, if desired, to ground, while plate 4 is connected to the positive terminal of a direct current source through a carrier-bypassed load resistor 5. The modulation signal voltage across resistor 5 is transmitted to a subsequent utilization network. Of course, the detector may be of the grid leak type if desired. Since it rectifies amplitude-modulated carrier wave voltage, a device must be used prior thereto for transforming the frequency-variable carrier waves into carrier waves of constant frequency and variable amplitude. In other words, the limiter is followed by a discriminator which acts to transform the limited frequency modulated (FM) carrier waves into amplitude modulated (AM) carrier waves.

The discriminator employed herein comprises a tube 6 having at least a grid 7, a cathode 8 and plate 9. The cathode may be at ground potential, and the grid is connected to ground through the coil 10 of tuned circuit 10—11. In the plate circuit of tube 6 is a tuned circuit 12—13, coil 12 being connected between the plate 9 and the positive terminal of the plate direct current source. The tuned circuit 10—11 is magnetically coupled to circuit 10'—11' arranged in the plate circuit of the limiter tube. Coils 10' and 10 are reactively coupled so that network 10'—11 has a pass band of 200 kc. Each of circuits 10'—11', 10—11 and 13—12 is tuned to the center, or mid-band, frequency of the FM waves. Since the limiter is fed by I. F. waves, the operating I. F. value (which may be of the order of 4 mc.) may be the resonant frequency of the said tuned circuits.

The control grid 3 of rectifier 1 is connected to the grid 7 of the discriminator tube. The dotted line capacity 14 denotes the grid to plate capacity of tube 6 which is inherent in a tube of the triode type. Where the inherent inter-electrode capacity 14 is insufficient in magnitude, external capacity may be added to augment capacity 14 to secure the desired results. Owing to the mutual coupling of the tuned grid and anode circuits through the grid-plate capacity, changes of tuning in the anode circuit of tube 6 produce a variation of the amplification of the tuned grid circuit. If the plate current appears inductive the amplification is greater than for a plain tuned circuit. If the anode circuit is capacitative, the amplification is below normal.

The change in amplification in the tuned grid circuit of tube 6 may be represented by a parallel conductance across the tuned circuit which may be positive or negative according as the anode circuit appears capacitive or inductive. These facts are well known about a triode having tuned grid and plate circuits. I have utilized such phenomena to provide a novel type of discriminator for FM waves. When the plate load 13—12 is in resonance with the center frequency of circuit 10—11, then load 13—12 acts like a resistance. Hence, for all practical purposes it reflects no damping, or undamping, across input 10—11 through capacity 14. As the instantaneous frequency of the waves applied at 10—11 varies in value positive and negative relative to center frequency, the tuned plate load 13—12 appears as an inductive or capacitive reactive load. If the plate load 13—12 appears inductive, it reflects a negative impedance across 10—11, and the amplification is greater than at center frequency. On the other hand, if the plate load is capacitive, the input circuit 10—11 is damped. In other words, the phase of the new voltage built up across 10—11, due to reflected positive and negative impedance across 10—11, varies +45° and —45° from a mid-value.

The new voltage developed across 10—11, and existing at grid 7, is the vector sum and difference between the normal and reflected phase value. The voltage across 10—11 is then seen to be a wave voltage of variable amplitude corresponding to the frequency deviations of the FM waves.

In Fig. 2 there is shown the resultant characteristic of the discriminator network. There is plotted "Frequency" as abscissae against "Damping reflected on grid circuit" as ordinates. It will be observed that as the frequency deviates to the right and left of the center frequency Fc, the damping effect reflected across the tuned grid circuit 10—11 varies as well. It will, also, be noted that the characteristic has the required S-shaped configuration. The resultant amplitude modulated carrier voltage developed across the tuned grid circuit 10—11 may be directly rectified as shown in the case of Fig. 1. However, the present invention is not limited to such utilization. Of course, any well known means may be employed if necessary to suppress self-oscillation. For example, a suppression resistor could be inserted in series with grid 7.

In Fig. 3 there is shown an arrangement wherein a separate rectifier tube is dispensed with. Here tube 6' functions both as the discriminator device as well as the rectification device. The cathode of the tube is established at ground potential, while the control grid 7' is connected to the high potential side of the input circuit 10—11. The plate 9' is connected to the positive terminal of the direct current source through the coil 12' and the load resistor 5'. Of course, both the input circuit 10—11 and the output circuit 13'—12' are each tuned to the center frequency. Here, again, as the instantaneous frequency of the applied FM waves varies the damping of circuit 10—11 varies, and, as a result, there will be developed across circuit 10—11 the amplitude modulated carrier wave voltage. This variable amplitude voltage exists at grid 7', and, hence, the modulation signal voltage will be developed across resistor 5' by virtue of the rectification action of the triode.

In Fig. 4 there is shown another modification of the invention, wherein a single tube 20 is employed for performing both discrimination and rectification. The tube 20 may be of the pentode type, and comprises a cathode 21, a control grid 22, a positive screen grid 23, a suppressor grid 24, and a plate 25. The cathode 21 may be grounded, or it may be connected to ground through a properly by-passed, self-biasing resistor. The input circuit 10—11 is connected between the control grid 22 and ground, and is tuned to the center frequency of the applied FM waves. It will be understood that in both Figs. 3 and 4 the circuit 10—11 is coupled to the tuned output circuit of the limiter tube. The screen grid 23, in this case, functions in the manner of plate 9 of tube 6 in Fig. 1. Hence, the grid 23 is connected to a source of direct current through the coil 40 of tuned circuit 40—41. The latter is resonated to the center frequency in the same manner as circuit 10—11.

The suppressor grid 24 may be established at ground potential, while the plate 25 is connected to the positive terminal of the direct current source through the carrier-bypassed load resistor 50. The dotted line capacity 30 represents the inherent control grid-screen grid capacity which provides the mutual coupling through which the reactive impedance of circuit 41—40 is reflected across circuit 10—11. It will, therefore, be seen that cathode 21, control grid 22 and screen grid 23 function in the manner of the discriminator tube 6 in Fig. 1, whereas the cathode, control grid 22 and plate 25 function in the manner of the rectifier tube 1. Of course, if the inherent capacity 30 is insufficient in magnitude, then external capacity may be connected between grid 22 and grid 23 to augment the capacity 30.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. In combination, an electron discharge tube provided with at least a cathode, control grid and output electrode, a tuned circuit connected to said control grid, a tuned circuit connected to said output electrode, each of said tuned circuits being resonated to the same frequency, a source of frequency-variable waves coupled to said tuned grid circuit, and said resonant frequency being the center frequency of said source waves, means providing sufficient capacitative reactance between said grid and output electrode to cause the damping of said tuned grid circuit to vary substantially with the frequency variation of said waves, and means for utilizing resultant waves of variable amplitude produced across said tuned grid circuit by said varying damping.

2. In combination, an electron discharge tube provided with at least a cathode, control grid and output electrode, a tuned circuit connected to said control grid, a tuned circuit connected to said output electrode, each of said tuned circuits being resonated to the same frequency, a source of angular velocity-modulated carrier waves coupled to said tuned grid circuit, and said resonant frequency being the center frequency of said source waves, means providing sufficient capacitative reactance between said grid and output electrode to cause the damping of said tuned grid circuit to vary substantially with the frequency variation of said waves, rectification means operatively associated with said tuned grid circuit for rectifying resultant waves of variable amplitude produced across said tuned grid circuit.

3. In combination, an electron discharge tube having at least a cathode, a control grid, an output electrode and an auxiliary intermediate cold electrode, a resonant input circuit connected to said control grid, a resonant output circuit connected to said intermediate electrode, a load resistor connected to said output electrode, said input and output circuits being each tuned to the center frequency of frequency modulated waves which are applied to said input circuit, means providing sufficient capacity between the control grid and intermediate electrode to reflect across said input circuit variable damping effects dependent upon the sign of the reactance of said output circuit, and means for utilizing modulation voltage developed across said load resistor.

4. In combination with a triode having tuned grid and plate circuits each resonated to a common frequency, a source of frequency-variable carrier waves coupled to the tuned grid circuit, said common frequency being the center frequency of said source waves, and a rectifier coupled to said tuned grid circuit for utilizing voltage of variable amplitude developed across said tuned grid circuit by virtue of damping variation of said tuned grid circuit caused by reactance sign changes in said tuned plate circuit.

5. In a system of the type using an electron discharge tube having tuned input and output circuits each resonated to the center frequency of applied frequency-variable waves and having inherent capacity coupling said input and output circuits, the method which includes applying said frequency-variable waves to the input circuit thereby to develop across said input circuit damping variations corresponding to changes in polarity of the reactance of said tuned output circuit, and rectifying amplitude modulated voltage produced across said input circuit by virtue of said damping variation.

6. In combination, an electron discharge tube provided with at least a cathode, control grid and output electrode, a tuned circuit connected to said control grid, a tuned circuit connected to said output electrode, each of said tuned circuits being resonated to the same frequency, a source of frequency-variable waves coupled to said tuned grid circuit, and said resonant frequency being the center frequency of said source waves, inherent capacitative reactance between said grid and output electrode to cause the damping of said tuned grid circuit to vary substantially with the frequency variation of said waves, and means for detecting resultant waves of variable amplitude produced across said tuned grid circuit by said varying damping.

7. In combination, an electron discharge tube provided with at least a cathode, control grid and output electrode, a tuned circuit connected to said control grid, a tuned circuit connected to said output electrode, each of said tuned circuits being resonated to the same frequency, a source of angular velocity-modulated carrier waves coupled to said tuned grid circuit, and said resonant frequency being the center frequency of said source waves, inherent coupling capacity between said grid and output electrode to cause the damping of said tuned grid circuit to vary substantially with the frequency variation of said waves, and a detector operatively associated with said tuned grid circuit for detecting resultant waves of variable amplitude produced across said tuned grid circuit.

8. In combination, an electron discharge tube having at least a cathode, a control grid, an output electrode and an intermediate cold electrode, a resonant input circuit connected to the control grid, a resonant output circuit connected to said intermediate electrode, a load resistor connected to said output electrode, said input and output circuits being tuned to the center frequency of frequency modulated waves which are applied to said input circuit, inherent capacity existing between the control grid and intermediate electrode to reflect across said input circuit variable damping effects dependent upon the sign of the reactance of said output circuit, and means for detecting modulation voltage developed across said load resistance.

9. In combination with a triode having tuned grid and plate circuits resonated to a common frequency and coupled by inherent capacity, a source of frequency-variable carrier waves coupled to the tuned grid circuit, and said common frequency being the center frequency of said source waves, and a detector coupled to said tuned grid circuit for utilizing voltage of variable amplitude developed across said tuned grid circuit by virtue of damping variation of said tuned grid circuit caused by reactance sign changes in said tuned plate circuit.

10. In a system of the type using an electron discharge tube having tuned input and output circuits each resonated to the mid-frequency of applied frequency modulated carrier waves and having reactive coupling between said input and output circuits, the method which includes applying said waves to the input circuit thereby to develop across said input circuit damping variations corresponding to changes in polarity of the reactance of said tuned output circuit, and detecting amplitude modulated voltage produced across said input circuit by virtue of said damping variation.

11. In a system of the type using an electron discharge device having input and output circuits each resonated to the mean frequency of applied angular velocity-modulated carrier waves and having reactive coupling between said input and output circuits, the method which includes applying said waves to the input circuit thereby to develop across said input circuit damping variations caused by changes in polarity of the reactance of said tuned output circuit, and utilizing resulting amplitude modulated voltage developed across said input circuit by virtue of said damping variation.

SEYMOUR HUNT.